(12) United States Patent
Saito

(10) Patent No.: US 9,094,600 B2
(45) Date of Patent: Jul. 28, 2015

(54) IMAGE CAPTURING APPARATUS AND CONTROL METHOD THEREFOR

(71) Applicant: CANON KABUSHIKI KAISHA, Tokyo (JP)

(72) Inventor: Junichi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 13/899,430

(22) Filed: May 21, 2013

(65) Prior Publication Data

US 2013/0321667 A1 Dec. 5, 2013

(30) Foreign Application Priority Data

Jun. 4, 2012 (JP) ................................. 2012-127382

(51) Int. Cl.
*H04N 5/232* (2006.01)
*H04N 9/73* (2006.01)
(52) U.S. Cl.
CPC ............. *H04N 5/23212* (2013.01); *H04N 9/73* (2013.01); *H04N 9/735* (2013.01)
(58) Field of Classification Search
USPC ................ 348/345, 347, 222.1, 225.1, 229.1, 348/221.1, 223.1, 255, 254, 234, 235, 236
See application file for complete search history.

(56) References Cited

U.S. PATENT DOCUMENTS

| 7,505,075 | B2 * | 3/2009 | Watanabe ...................... 348/354 |
| 8,400,524 | B2 * | 3/2013 | Okamoto et al. .......... 348/231.2 |
| 8,947,554 | B2 * | 2/2015 | Kitajima .................... 348/223.1 |
| 2011/0157316 | A1 * | 6/2011 | Okamoto et al. .............. 348/46 |
| 2011/0157402 | A1 * | 6/2011 | Kitajima .................... 348/222.1 |

FOREIGN PATENT DOCUMENTS

JP 2007-329687 A 12/2007

* cited by examiner

*Primary Examiner* — Ahmed A Berhan
(74) *Attorney, Agent, or Firm* — Canon USA, Inc. I.P. Division

(57) ABSTRACT

An apparatus and method such that when a signal intensity evaluation value is greater than or equal to a predetermined value, a signal intensity amplification factor of each color component is changed in accordance with the signal intensity evaluation value of the color component, and when the signal intensity evaluation value is less than the predetermined value, at least a signal intensity amplification factor of a color component, of which signal intensity evaluation value of the color component is the least, is set at a predetermined value not dependent upon the signal intensity evaluation value of the color component.

15 Claims, 11 Drawing Sheets

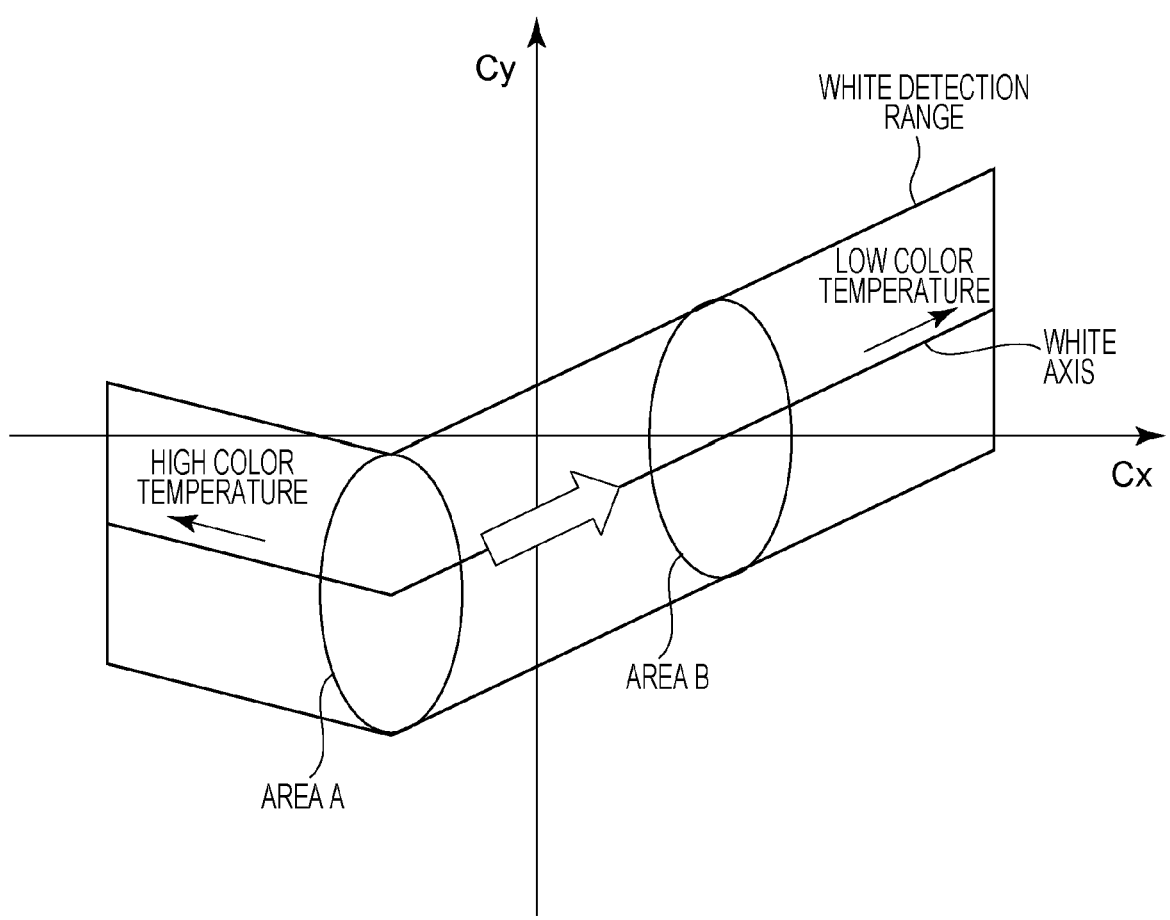

IMAGE CAPTURING APPARATUS AND CONTROL METHOD THEREFOR

BACKGROUND OF THE INVENTION

1. Field of the Invention

The present invention relates to an image capturing apparatus and a control method therefor, and particularly to an image capturing apparatus such as a digital video camera and a digital still camera for carrying out automatic focusing and to a control method therefor.

2. Description of the Related Art

A contrast AF method for carrying out automatic focusing contrast information of a subject image captured by an image capturing device is an automatic focusing method widely used by image capturing apparatuses. In the contrast AF method, only a particular frequency component is extracted by bandpass filter processing from a pixel signal obtained from the image capturing device, and the in-focus state of the image capturing apparatus is detected using the frequency component as a focal evaluation value.

In the automatic focusing based on the contrast AF method, a signal of each of RGB color components obtained by the image capturing device may be subjected to white balance processing (WB processing) to be converted into a brightness signal, and thereafter bandpass filter processing may be performed. This is because, for example, when the output signals of the color components are different in the signal intensity, an amplification factor for an output signal of which signal intensity is low is increased as compared with an amplification factor for an output signal of which signal intensity is high, whereby the output signal of which signal intensity is low is complemented, and evaluation is performed without color deviation.

More specifically, in order to normalize the signal intensity of the output signal of each color component, an output signal of a color component of which signal intensity is low is multiplied by a white balance coefficient having a high value, and an output signal of a color component of which signal intensity is high is multiplied by a white balance coefficient having a low value.

With such a method, when in-focus state of a subject having multiple color components is detected with an optical system having a high on-axis chromatic aberration caused by the performance of the image capturing optical system of the image capturing apparatus, only colors having high signal intensity may be simply evaluated, which can reduce the difference of the in-focus position thus caused.

For example, Japanese Patent Application Laid-Open No. 2007-329687 (no corresponding publications in foreign countries) explains white balance processing on the image explained above in detail.

As explained in Japanese Patent Application Laid-Open No. 2007-329687, the white balance coefficient used for the white balance processing includes a value of a ratio between an average of all signal intensities in the AF evaluation area (AveYi of Japanese Patent Application Laid-Open No. 2007-329687 (no corresponding publications in foreign countries)) and an average of the signal intensity of each color component (AveR, AveG1, AveG2, AveB of Japanese Patent Application Laid-Open No. 2007-329687), and accordingly, this complements the difference of the signal intensities of the output signals of the color components, making the AF evaluation possible by eliminating the deviation of the colors. This processing is referred to as normalization.

However, when the conventional technique disclosed in Japanese Patent Application Laid-Open No. 2007-329687 is applied to a low illuminance, an output signal of a color originally having an extremely low signal intensity is multiplied by an extremely high white balance coefficient, which unnecessarily amplifies a noise component of the original output signal.

More specifically, the ratio of the noise component of an output signal having a small signal intensity is high, and accordingly, when an output signal having a high ratio of the noise component is multiplied by an extremely high white balance coefficient in order to normalize the signal intensity of the output signal of each color component, the noise component of the original output signal is unnecessarily amplified, which causes a problem in that the accuracy of the focal evaluation value is reduced.

SUMMARY OF THE INVENTION

Accordingly, aspects of the present invention generally relate to providing an image capturing apparatus having superior contrast AF performance even under a low illuminance environment.

According to an aspect of the present invention, an image capturing apparatus includes an image capturing device for capturing a subject image that has passed through an image capturing optical system having a focal point optical system, a brightness signal processing unit for generating a brightness signal obtained by performing signal intensity correction processing using a signal intensity amplification factor on an output signal of each color component which is output from the image capturing device, a focal evaluation value calculation processing unit for calculating a focal evaluation value by extracting a particular frequency component from the brightness signal, a signal intensity detection unit for calculating a signal intensity evaluation value of each color component in an area on the image capturing device where a brightness signal is generated, the area corresponding to a focus detection area, and a control unit. When a signal intensity of the output signal is greater than or equal to a predetermined value, the control unit changes the signal intensity amplification factor of each color component in accordance with the signal intensity evaluation value of the color component, and when the signal intensity of the output signal is less than the predetermined value, the control unit sets at least a signal intensity amplification factor of a color component, of which signal intensity evaluation value of the color component is the least, at a value different from the signal intensity amplification factor of the color component.

Further features of the present invention will become apparent from the following description of exemplary embodiments (with reference to the attached drawings).

BRIEF DESCRIPTION OF THE DRAWINGS

FIG. 4 is a Cy-Cx relationship diagram illustrating white balance coefficient calculation performed by the image capturing apparatus according to the first embodiment.

DESCRIPTION OF THE EMBODIMENTS

Hereinafter, exemplary embodiments of the present invention will be explained in detail with reference to the appended drawings.

First Embodiment

Hereinafter, the first embodiment of the present invention in which correction processing of signal intensities of pixel signals is performed will be explained with reference to FIGS. 1 to 5.

Figure 1:
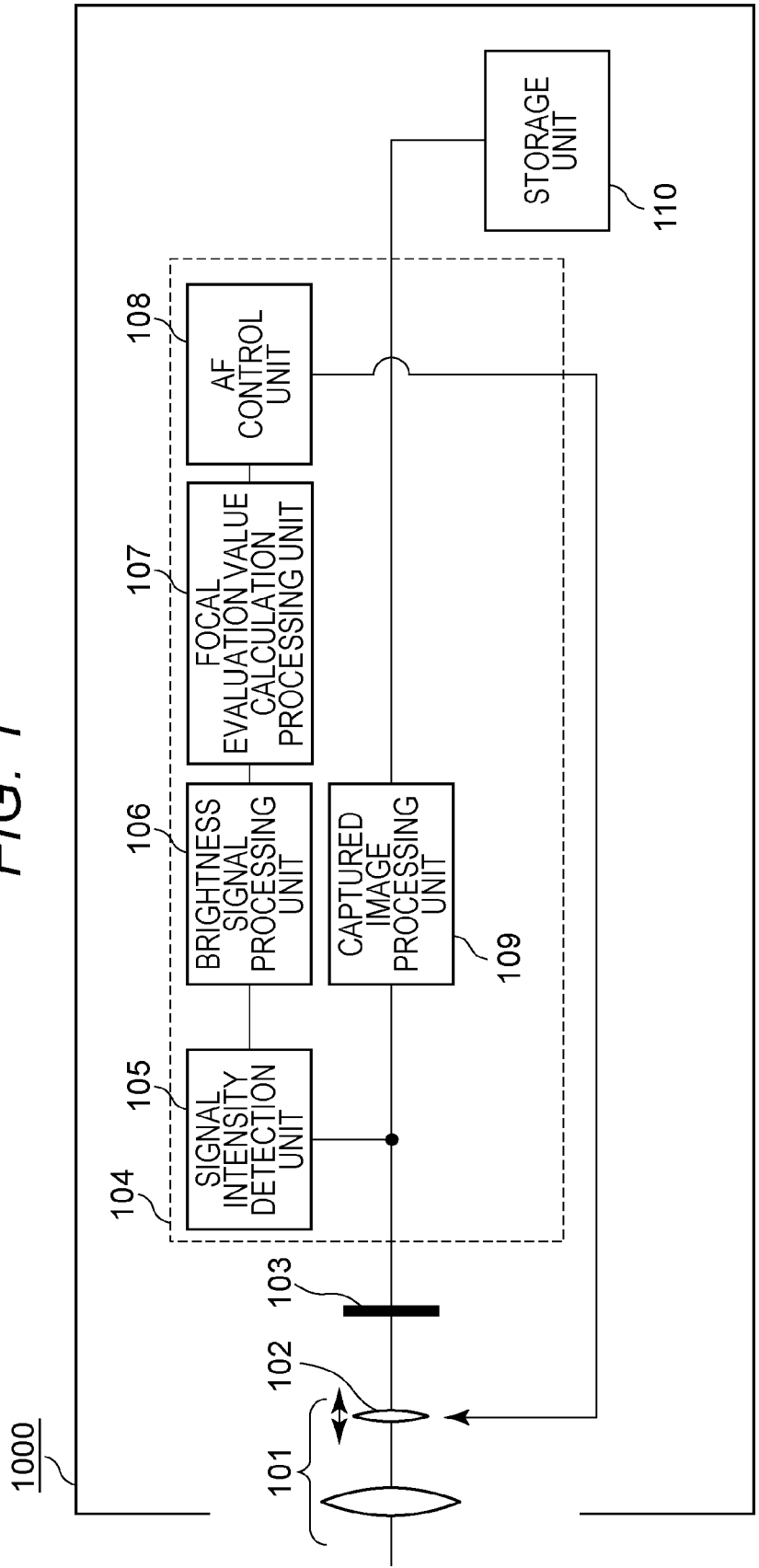
FIG. 1 is a block diagram illustrating a configuration of an image capturing apparatus according to a first embodiment and a third embodiment.

FIG. 1 is a block diagram illustrating a configuration of an image capturing apparatus 1000 according to the first embodiment of the present invention. The image capturing apparatus 1000 is a compact digital camera. An image capturing optical system 101 guides the light beam from the subject to an image capturing plane of the image capturing device. An image is formed on an image capturing device 103 by the image capturing optical system 101 including a focus lens 102 which is the focal point optical system. The image capturing device 103 has an image capturing plane on which a subject image having passed through the image capturing optical system 101 is formed.

The image capturing device 103 has a color filter (not shown) of Bayer layout which is provided on the front side of the image capturing plane thereof, and the subject image is separated into colors of red, green, and blue, by the Bayer layout color filters R, G1, G2, B.

The focus lens 102 which is a focal point optical system has a function of changing the focus state of the subject image.

A subject image converted into an electric signal by the image capturing device 103 on which the subject image having passed through the image capturing optical system is formed is read by a CPU 104 as a signal intensity of each color component.

The CPU 104 serving as a control unit includes a signal intensity detection unit 105 for calculating a signal intensity evaluation value of each color component in an area, where a brightness signal is generated, on the image capturing device corresponding to a focus detection area F, and also includes a brightness signal processing unit 106, a focal evaluation value calculation processing unit 107, and an AF control unit 108. The processing operation for a series of contrast AF (TV-AF) is carried out by the CPU 104 serving as the control unit.

The signal intensity detection unit 105 detects, for each color within the focus detection area set by the user, the signal intensities R, G1, G2, B of the output signals of the color components of red, green, and blue which are separated into colors by the Bayer layout color filters in the image capturing device 103.

The signal intensity detection unit 105 generates white balance coefficients kWB_R, kWB_G1, kWB_G2, kWB_B for the color components explained later and average values $I_R$, $I_{G1}$, $I_{G2}$, $I_B$ within the focus detection area of the signal intensity of each color component, on the basis of the signal intensities R, G1, G2, B of the output signals of the color components obtained by photoelectrically converting the subject image from the subject in the focus detection area.

The brightness signal processing unit 106 generates a brightness signal, which is a target of the focal evaluation value calculation, obtained by photoelectrically converting the subject image from the subject within the focus detection area. The focal evaluation value calculation processing unit 107 extracts a particular frequency component from the brightness signal, and calculates it as a focal evaluation value.

AF control unit 108 drives and controls the focus lens 102, refers to the focal evaluation value calculated by the focal evaluation value calculation processing unit 107 in accordance with the position of the focus lens 102, calculates the position of the focus lens 102 where the light beam is in the focus state on the image capturing plane of the image capturing device 103, and drives the focus lens 102.

The captured image processing unit 109 provided in the CPU 104 performs data conversion, such as compression of signal intensity, according to a recording (storing) format selected by a user. The captured image which has been subjected to the data conversion is stored in a storage unit 110.

Figure 2:
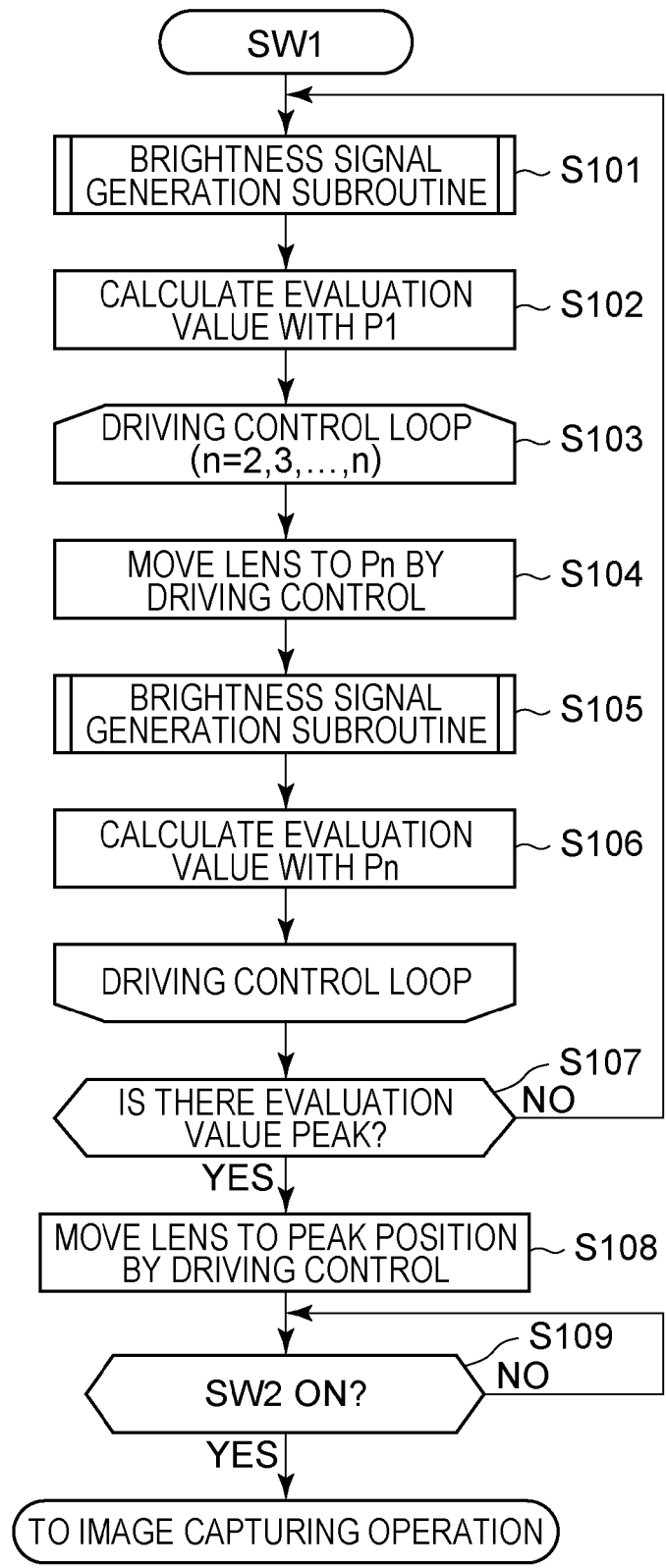
FIG. 2 is a flow diagram illustrating contrast AF operation performed by the image capturing apparatus according to the first embodiment.

FIG. 2 is a flow diagram for explaining the operation for detecting the in-focus position of the focus lens 102 capable of changing the focus state of the subject image by searching and driving a predetermine section in the contrast AF operation carried out by the image capturing apparatus 1000. This flow is started with half press operation (SW1) of a shutter button with which the user starts taking pictures, and this flow shows as far as transition to image capturing operation. In this case, the focus lens 102 capable of changing the focus state of the subject image is stopped at a position $P_1$ as an initial position.

Step S101 is a sub-routine for generating a brightness signal required for the focal evaluation value calculation. This will be explained later.

In step S102, the focal evaluation value is calculated while the signal intensity obtained from the brightness signal generation sub-routine (step S101) with the focus lens 102 being at the position $P_1$ is adopted as the original image. The focal evaluation value is a value which is obtained by causing the focal evaluation value calculation processing unit 107 to extract a particular frequency component from the brightness signal obtained from the signal intensity. When the focal evaluation value is higher, this serves as an index indicating that the image-forming state of the light beam on the image capturing device 103 is closer to the in-focus state.

The driving control loop starting from step S103 is a driving control loop for causing the AF control unit 108 to move the focus lens 102 over a section from a position $P_2$ of the focus lens 102 determined in advance to a position $P_n$ of the focus lens 102.

In step S104, the AF control unit drives the focus lens 102 to the position $P_2$. Subsequently, like step S101, in step S105, the brightness signal generation is performed, based on which, in step S106, the focal evaluation value calculation processing unit 107 calculates the focal evaluation value. Thus, the driving control loop is executed as a loop, and this is repeated successively with the position $P_3, P_4, \ldots, P_n$ of the focus lens 102. In step S107, the AF control unit 108 determines whether the evaluation values calculated in the driving control loop until then includes any value which becomes a predetermined peak.

When the AF control unit 108 determines that the evaluation values calculated in the driving control loop until then includes a peak of the focal evaluation value, the AF control unit calculates a position $P_f$ which makes the focal evaluation value the largest value, and drives the focus lens 102 to the position $P_f$ (step S108). In the calculation of the position $P_f$, a known interpolation calculation is used. When the AF control unit 108 determines that the evaluation values calculated in the driving control loop until then does not include any peak of the focal evaluation value in S107, step S101 is performed again, in which operation for searching and driving is repeated again.

Thereafter, in step S109, when it is determined that the user does full press (SW2) of the shutter button meaning a main image capturing command, the image capturing operation is subsequently performed, and this flow is terminated.

Hereinafter, a calculation method of a white balance coefficient serving as a signal intensity amplification factor calculated by the signal intensity detection unit 105 calculating the signal intensity evaluation value of each color component in an area where a brightness signal on the image capturing device corresponding to the focus detection area F is generated will be explained.

Figures 3A, 3B:
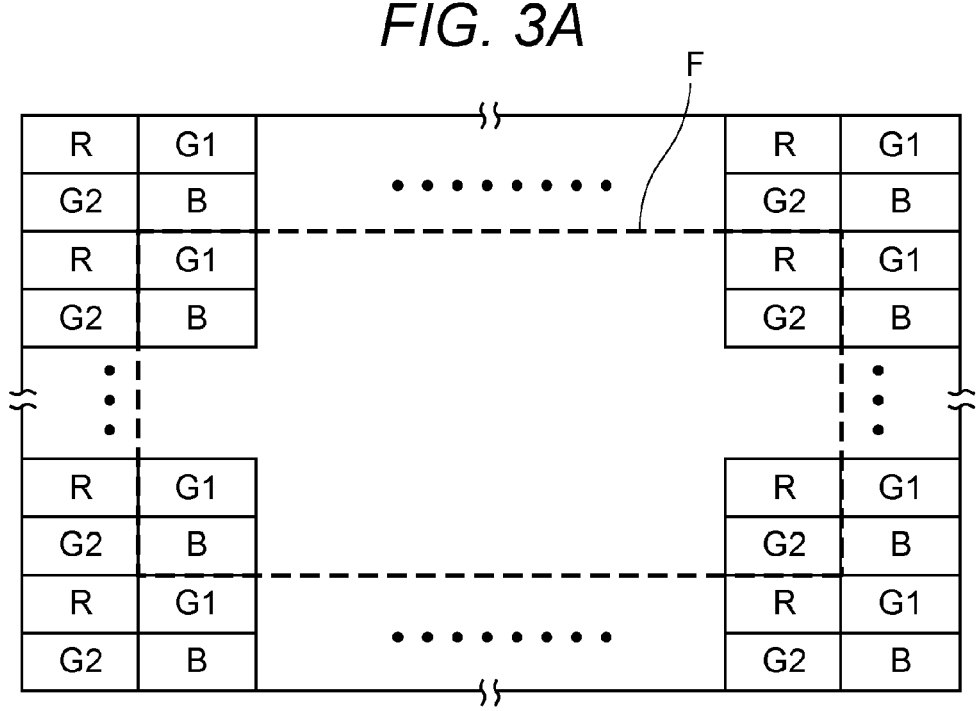
FIGS. 3A and 3B are schematic diagrams illustrating arrangement state of an image capturing device according to the first embodiment.

First, the light beam incident through the color filter of the Bayer layout color filters R, G1, G2, B is converted by the image capturing device 103 into output signals having signal intensities R, G1, G2, B of the color components (FIG. 3A). The output signals are converted from analog into digital signals and are configured in units of basic blocks respectively including the signal intensities R, G1, G2, B of the color components (FIG. 3B).

For each of these basic blocks, the evaluation values Cx, Cy, Yi of the color components are calculated on the basis of the expression 1 below. R, G1, G2, B represent the outputs of the signal intensities at the pixels. It should be noted that, in FIG. 3A, an area F indicated by a thick broken line represents the focus detection area in question.

$$C_x = \frac{(R+G2)-(B+G1)}{Y_i}$$ [Math 1]

$$C_y = \frac{(R+B)-(G1+G2)}{Y_i}$$

$$Y_i = \frac{R+G1+G2+B}{4}$$

FIG. 4 is a figure illustrating a color space in which the horizontal axis is Cx, and the vertical axis is Cy. In FIG. 4, white color ranging from a high color temperature to a low color temperature is captured in advance, and FIG. 4 shows a white axis determined by plotting color evaluation values Cx, Cy. With an actual light source, the white color slightly varies.

For example, the color evaluation value of white color under a light source of a high color temperature such as solar light is distributed as shown in the area A of FIG. 4. On the other hand, the color evaluation value of white color under a light source of a low color temperature such as white tungsten is distributed as shown in the area B of FIG. 4. For this reason, a range having a certain width with the white axis being the center is adopted as a white detection range (area which is to be determined to be white).

The color evaluation values Cx, Cy calculated for each block are plotted in FIG. 4. Among them, a block having a color evaluation value included in the white detection range is assumed to be white color. Then, integral values SumR, SumG1, SumG2, SumB of color pixels in the white detection range are calculated, and average values AveR, AveG1, AveG2, AveB, AveYi are calculated on the basis of the expression 2 from the number of samples N.

$$AveR = \frac{SumR}{N}$$ [Math 2]

$$AveG1 = \frac{SumG1}{N}$$

$$AveG2 = \frac{SumG2}{N}$$

$$AveB = \frac{SumB}{N}$$

$$AveY_i = \frac{SumR+SumG1+SumG2+SumB}{4N}$$

Then, the white balance coefficient is calculated on the basis of the expression 3. However, kWB_R, kWB_G1, kWB_G2, kWB_B are white balance coefficients corresponding to the signal intensities R, G1, G2, B of the color components.

$$kWB\_R = \frac{AveY_i}{AveR}$$ [Math 3]

$$kWB\_G1 = \frac{AveY_i}{AveG1}$$

$$kWB\_G2 = \frac{AveY_i}{AveG2}$$

$$kWB\_B = \frac{AveY_i}{AveB}$$

More specifically, the white balance coefficient kWB of each color component as shown in the expression 3 is a value that changes in accordance with a rate of existence of the output signal of each color component included in the area which is to be determined to be white area existing in the focus detection area F. It is understood that, when the rate of existence increases, the white balance coefficient kWB of each color component as shown in the expression 3 decreases in inverse proportion thereto.

The brightness signal processing unit 106 multiplies the signal intensity of the corresponding color component by each of the white balance coefficients kWB, whereby the signal intensities of all the colors become uniform values on the basis of white color, i.e., this enables generation of a brightness signal that varies little between adjacent pixels. This processing is called normalization.

In the present embodiment, the brightness signal processing unit 106 switches whether the white balance coefficient calculated with each color component is to be used as a coefficient dependent on the signal intensity of each color component.

Figure 5:
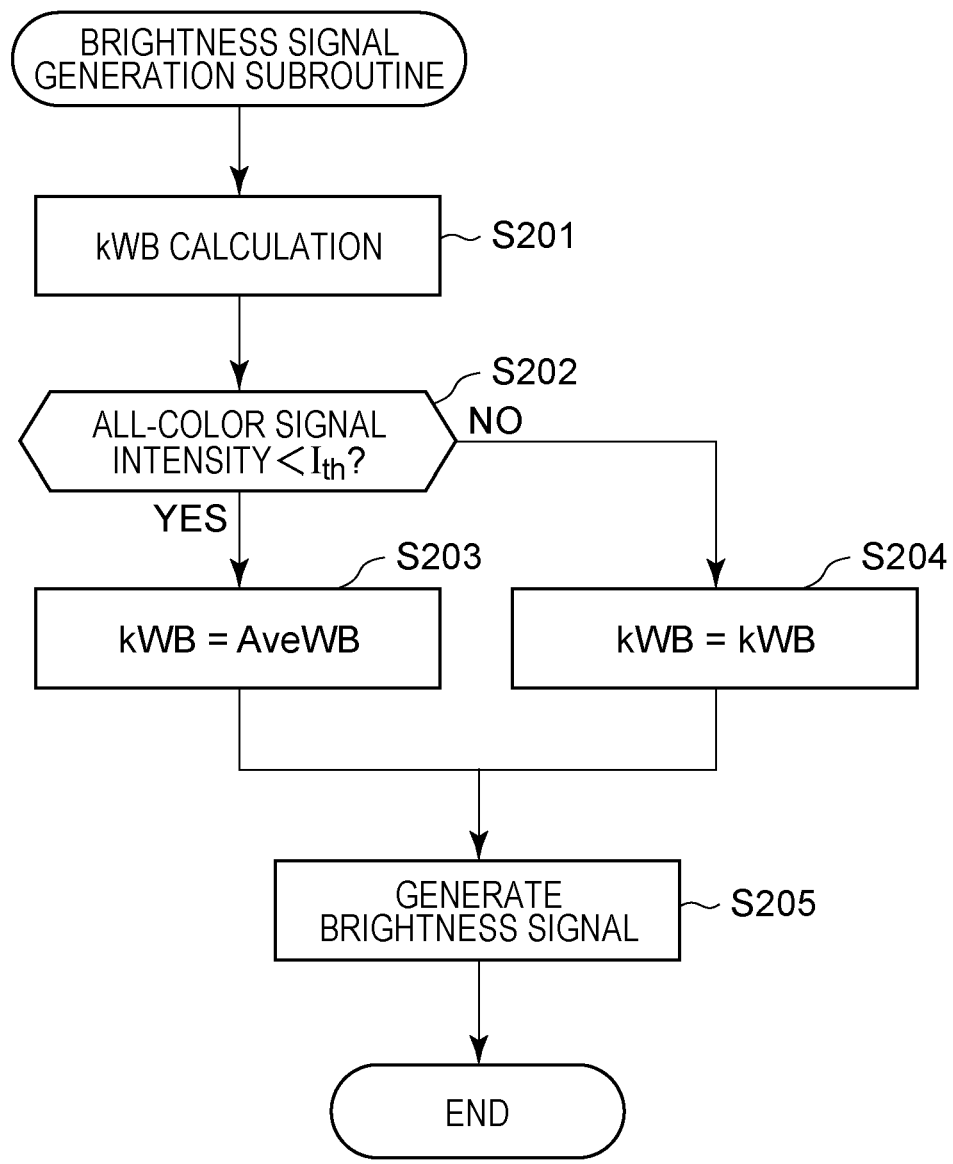
FIG. 5 is a flow diagram illustrating brightness signal generation performed by the image capturing apparatus according to the first embodiment.

FIG. 5 is a flow diagram illustrating a brightness signal generation sub-routine performed in steps S101 and S105 of FIG. 2 by the focal evaluation value calculation processing unit 107 from reading of the pixel signals serving as the output signals from the image capturing device 103 in the contrast AF operation performed by the image capturing apparatus 1000 according to the first embodiment of the present invention.

With the pixel signal in the focus detection area F guided to the CPU 104 serving as the control unit, the signal intensity detection unit 105 calculates the white balance coefficient kWB explained above (step S201). Further, a determination as shown in step S202 explained below is made. More specifically, as shown in the expression 4, a determination is made as to whether all the average values $I_R$, $I_{G1}$, $I_{G2}$, $I_B$ of the signal intensities serving as the signal intensity evaluation values of the color components included in the focus detection area F are less than a threshold value $I_{th}$ which defines a low brightness of a subject.

$$I_R = \frac{\sum_{m=1}^{M} R_m}{M}$$

$$I_{G1} = \frac{\sum_{m=1}^{M} G1_m}{M}$$

$$I_{G2} = \frac{\sum_{m=1}^{M} G2_m}{M}$$

$$I_B = \frac{\sum_{m=1}^{M} B_m}{M}$$

[Math 4]

However, M denotes the number of sets as shown in FIG. 3B included in the focus detection area F, and is a value corresponding to the number of pixels of each color component. In this case, the average values $I_R$, $I_{G1}$, $I_{G2}$, $I_B$ of the signal intensities are used as the signal intensity evaluation values. However, the signal intensity evaluation values may be any other values as long as the brightness level of the signal intensity of the pixel signal of each color component in the focus detection area F can be appropriately evaluated. For example, the signal intensity evaluation values may be a summation of signal intensities of the pixel signals of all the pixels in the focus detection area F of each color component.

When this determination is YES (a case where the signal intensities of the pixel signals of all the color components in the focus detection area F are determined to be of low brightness), step S203 is subsequently performed. When the determination is NO in step S202 (a case where the signal intensity of the pixel signal of at least one of the color components in the focus detection area F is determined not to be of low brightness), step S204 is subsequently performed. In step S203, all the white balance coefficients kWB as shown in the expression 3 calculated by the signal intensity detection unit 105 as described above are called, and are replaced with AveWB which is the same constant C.

In this case, AveWB is an average value of four values, i.e., kWB_R, kWB_G1, kWB_G2, and kWB_B.

For example, all the values of kWB_R, kWB_G1, kWB_G2, kWB_B which are the white balance coefficients are 500.

This is for the following purpose. When the noise component rate of the pixel signal of each color component is high in low brightness condition, this prevents unnecessary amplification of the noise component by multiplying the white balance coefficient of the predetermined value C not dependent upon the signal intensity of the pixel signal of each color component in subsequent step S205.

In the present embodiment, the same constant C, which is "AveWB", is used, but as described above, the same can also be achieved with almost the same constant that can prevent unnecessary amplification of the noise component, and therefore, it may be a value of a predetermined constant that varies with a certain degree. For example, the values may be as follows: kWB_R=500, kWB_G1=505, kWB_G2=505, kWB_B=495.

In step S204, the white balance coefficients kWB_R, kWB_G1, kWB_G2, kWB_B of the color components as shown in the expression 3 calculated by the signal intensity detection unit 105 explained are determined to be thereafter used as kWB_R, kWB_G1, kWB_G2, kWB_B as they are. This is because a sufficient brightness that is not low illuminance can be obtained for the signal intensity of at least one color component, and therefore, even when the white balance coefficient is multiplied in subsequent step S205, the evaluation value calculation can be carried out without being affected by the noise.

In subsequent step S205, the signal intensity of the pixel signal in the focus detection area F is multiplied by the predetermined value AveWB obtained in step S202 or the white balance coefficients kWB_R, kWB_G1, kWB_G2, kWB_B of the color components as shown in the expression 3 obtained in step S203, and this is adopted as the brightness signal.

In the subsequent calculation of the focal evaluation value by the focal evaluation value calculation processing unit 107, the brightness signal on which the white balance processing is performed is used. This loop is terminated here.

It should be noted that, in the present embodiment, the above processing is carried out in steps S101 and S105 in FIG. 2. However, the present embodiment is not limited thereto. For example, processing before the brightness signal generation processing (S205) such as the calculation (S201) of the white balance coefficient kWB and the replacement (S203) of the white balance coefficient may be carried out only at the initial position $P_1$ of the focus lens 102.

As described above, in accordance with whether all of the average values $I_R$, $I_{G1}$, $I_{G2}$, $I_B$ of the signal intensity of each color component are less than the threshold value $I_{th}$ defining the low brightness of the subject, the determination is made as to whether to use all the white balance coefficients kWB_R, kWB_G1, kWB_G2, kWB_B dependent upon the signal intensity of each color component calculated by the signal intensity detection unit 105.

More specifically, in the present embodiment, when the signal intensity evaluation value is equal to or more than the predetermined value, the signal intensity amplification factor of each color component is changed in accordance with the signal intensity evaluation value of the color component. When the signal intensity evaluation value is less than the predetermined value, at least the signal intensity amplification factor of a color component of which signal intensity evaluation value of the color component is the least is adopted as the predetermined value not dependent upon the signal intensity evaluation value of each color component.

The following advantages are obtained. When the signal intensity is very low due to low illuminance, the white balance coefficient in inverse proportion to the average value of the signal intensities is not multiplied, and this can preferably prevent great rise in the standing noise caused by dark current included in weak signal intensity and components of random noise such as shot noise.

More specifically, a problem of reduction of the AF evaluation accuracy occurs in the following case. When, in order to normalize the signal intensity of each color component, an output signal of a color component having a low average value of signal intensity is multiplied by a white balance coefficient kWB of a high signal intensity amplification factor, and an output signal of a color component having a high average value of signal intensity is multiplied by a white balance coefficient kWB of a low signal intensity amplification factor, then a brightness signal with a high rate of noise component is generated, which reduces the accuracy of the AF evaluation.

A brightness signal having much noise is extracted as high frequency component during the bandpass filter processing performed by the focal evaluation value calculation processing unit 107, and therefore, during contrast evaluation of an image, it may be falsely extracted as an edge that does not actually exist.

Preventing the above false extraction will result in further enhancing the contrast AF performance under low illuminance. A brightness signal having good white balance can be generated for a pixel signal having relatively less noise under non-low illuminance, and therefore, the AF evaluation can be achieved with the brightness signal dependent upon the signal intensity of each color component.

Modification

In the first embodiment, when all the average values $I_R$, $I_{G1}$, $I_{G2}$, $I_B$ of the signal intensity of each color component are less than the threshold value $I_{th}$ defining low brightness of the subject, the white balance coefficient is replaced with the predetermined value C not dependent upon the signal intensity of each color component or the same constant C. In general, a color component of a pixel signal included in a subject often includes much green.

Therefore, the following modification is also effective. Unlike the first embodiment, the average values $I_R$, $I_{G1}$, $I_{G2}$, $I_B$ of the signal intensity of each color component are not compared. Instead, both of $I_{G1}$ and $I_{G2}$, or any one of $I_{G1}$ and $I_{G2}$ and $I_{th}$ are compared, and when $I_{G1}<I_{th}$ and (or) $I_{G2}<I_{th}$ holds, the white balance coefficient serving as the signal intensity amplification factor is replaced with a predetermined value or the same constant like the first embodiment.

Second Embodiment

Hereinafter, the second embodiment of the present invention in which correction processing of signal intensities of pixel signals is performed will be explained with reference to FIGS. 6 to 7.

Figure 6:
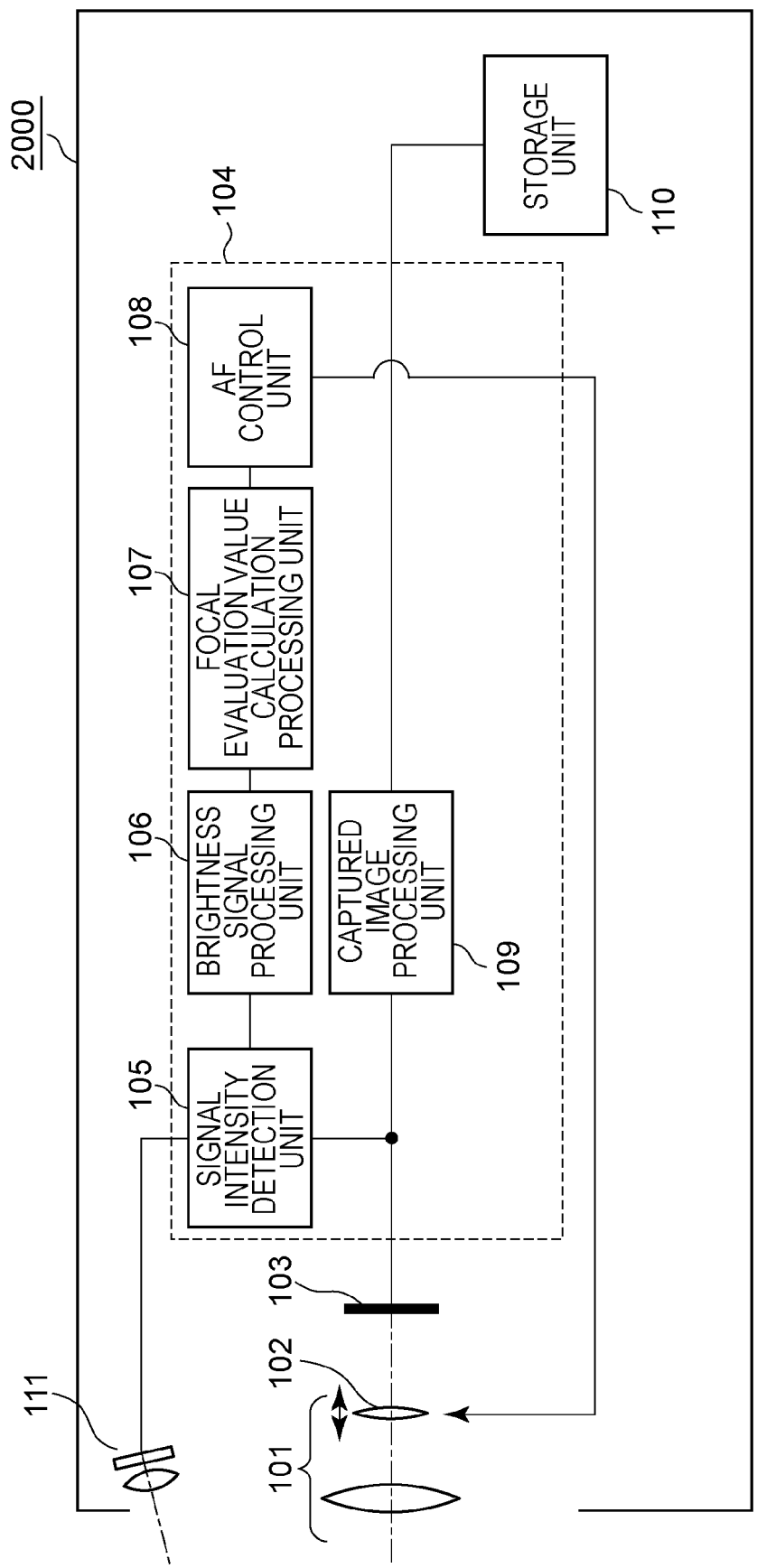
FIG. 6 is a block diagram illustrating a configuration of an image capturing apparatus according to a second embodiment and a fourth embodiment.

FIG. 6 is a block diagram illustrating a configuration of an image capturing apparatus 2000 according to the second embodiment of the present invention. The image capturing apparatus 2000 is a compact digital camera. The difference in the configuration from the image capturing apparatus 1000 according to the first embodiment lies in that the image capturing apparatus 2000 according to the second embodiment includes a photometry unit 111 for measuring brightness of a subject.

The photometry unit 111 detects the brightness value $BV_1$ of the subject. The brightness value $BV_1$ is referred to by the brightness signal processing unit 106 included in the CPU 104, and the following determination processing is carried out.

In accordance with whether all the average values $I_R$, $I_{G1}$, $I_{G2}$, $I_B$ of the signal intensities serving as the signal intensity evaluation values of the colors are less than the threshold value $I_{th}$ defining low brightness of the subject, the image capturing apparatus 1000 according to the first embodiment determines whether to use the white balance coefficients dependent upon the signal intensity of each color component as shown in the expression 3 calculated by the signal intensity detection unit 105.

In contrast, the image capturing apparatus 2000 according to the second embodiment of the present invention uses the photometry result given by the photometry unit 111 instead of the all the average values $I_R$, $I_{G1}$, $I_{G2}$, $I_B$ to determine whether to use the white balance coefficients dependent upon the signal intensity of each color component as shown in the expression 3 calculated by the signal intensity detection unit 105.

The method of calculation of the white balance coefficients serving as the signal intensity amplification factors is the same as the method described in the first embodiment, and therefore it is not described here.

In the contrast AF operation performed by the image capturing apparatus 2000, operation for detecting the in-focus position of the focus lens 102 by searching and driving a predetermined section is the same as FIG. 2 explained in the first embodiment, and therefore it is not described here.

Figure 7:
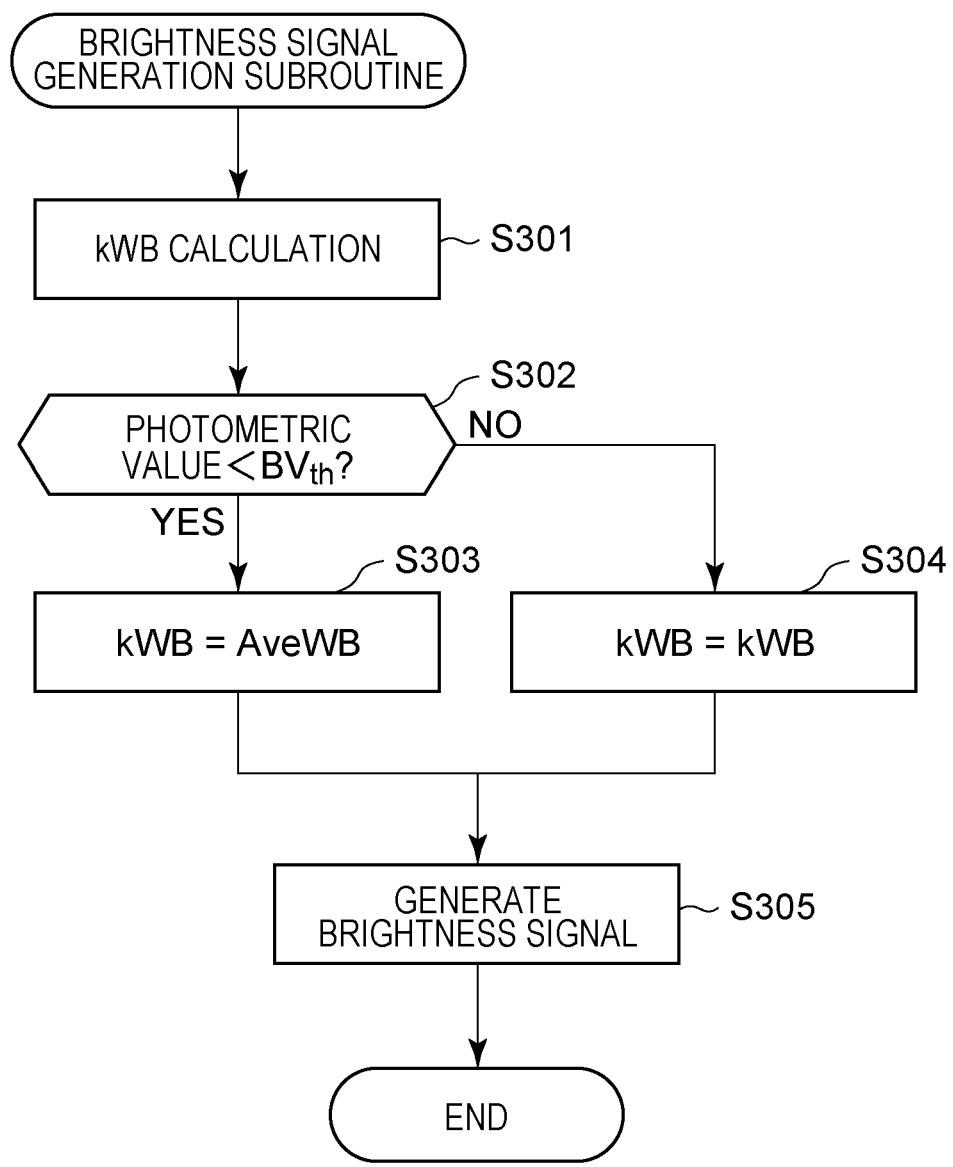
FIG. 7 is a flow diagram illustrating brightness signal generation performed by the image capturing apparatus according to the second embodiment.

FIG. 7 is a flow diagram illustrating a brightness signal generation sub-routine performed in steps S101 and S105 of FIG. 2 by the focal evaluation value calculation processing unit 107 from reading of the pixel signals serving as the output signals from the image capturing device 103 in the contrast AF operation performed by the image capturing apparatus 2000 according to the second embodiment. With the pixel signals guided to the CPU 104, the signal intensity detection unit 105 calculates the white balance coefficient kWB explained above (step S301). Further, a determination as shown in step S302 explained below is made.

More specifically, a determination is made as to whether a subject brightness $BV_1$ measured by the photometry unit 111 is less than a threshold value $BV_{th}$ of brightness which defines a low brightness of a subject. When this determination is YES (when the subject brightness $BV_1$ is less than the threshold value $BV_{th}$), step S303 is subsequently performed. When the determination is NO in step S302 (when the subject brightness $BV_1$ is a value equal to or more than the threshold value $BV_{th}$), step S304 is subsequently performed.

In step S303, all the white balance coefficients kWB_R, kWB_G1, kWB_G2, kWB_B of the color components as shown in the expression 3 calculated by the signal intensity detection unit 105 as described above are called (step S301), and are replaced with AveWB which is a predetermined value C.

Then, in step S305, the signal intensity of each color component in the focus detection area F is multiplied by AveWB which is the same constant obtained in step S302, and the product is adopted as the brightness signal.

In the subsequent calculation of the focal evaluation value by the focal evaluation value calculation processing unit 107, the brightness signals obtained here are used.

The white balance coefficient AveWB serving as the signal intensity amplification factor is an average value of the average values kWB_R, kWB_G1, kWB_G2, kWB_B of the signal intensity of each color component. In step S304, the white balance coefficients kWB_R, kWB_G1, kWB_G2, kWB_B of the color components as shown in the expression 3 calculated by the signal intensity detection unit 105 explained are determined to be thereafter used as kWB_R, kWB_G1, kWB_G2, kWB_B as they are.

Subsequently, in step S305, the output signals of the color components in the focus detection area F are multiplied by the white balance coefficients kWB_R, kWB_G1, kWB_G2, kWB_B of the color components as shown in the expression 3 obtained in step S304, and the product is adopted as the brightness signals.

In the subsequent calculation of the focal evaluation value by the focal evaluation value calculation processing unit 107, the brightness signals are used. This loop is terminated here.

It should be noted that, in the present embodiment, the above processing is carried out in steps S101 and S105 in FIG. 2. However, the present embodiment is not limited thereto. For example, processing before the brightness signal generation processing (S305) such as the calculation (S301) of the white balance coefficient kWB and the replacement (S203) of the white balance coefficient may be carried out only at the initial position $P_1$ of the focus lens 102.

As described above, in accordance with whether the photometry result given by the photometry unit 111 is less than the threshold value $BV_{th}$ of the brightness defining the low brightness of the subject, the determination is made as to whether to use the white balance coefficients of the color components as shown in the expression 3 calculated by the signal intensity detection unit 105.

More specifically, in the present embodiment, when the subject brightness detected by the photometry unit is equal to or more than the predetermined value, the signal intensity amplification factor of each color component is changed in accordance with the signal intensity evaluation value of the color component, and when the subject brightness detected by the photometry unit is less than the predetermined value, at least the signal intensity amplification factor of a color component of which signal intensity evaluation value of the color component is the least is adopted as the predetermined value not dependent upon the signal intensity evaluation value of each color component.

The following advantages are obtained. That is, when the signal intensity is very low due to low illuminance, the output signals of the color components are not multiplied by the white balance coefficients kWB_R, kWB_G1, kWB_G2, kWB_B of the color components as shown in the expression 3, and this can preferably prevent great rise in the standing noise caused by dark current included in weak signal intensity and components of random noise such as shot noise.

More specifically, a problem of reduction of the AF evaluation accuracy occurs in the following case. When, in order to normalize the signal intensity of each color component, an output signal of a color component having a low average value of signal intensity is multiplied by a high signal intensity amplification factor kWB, and an output signal of a color component having a high average value of signal intensity is multiplied by a low signal intensity amplification factor kWB, then a brightness signal with a high rate of noise component is generated, which reduces the accuracy of the AF evaluation.

A brightness signal having much noise is extracted as a high frequency component during the bandpass filter processing performed by the focal evaluation value calculation processing unit 107, and therefore, during contrast evaluation of an image, it may be falsely extracted as an edge that does not actually exist.

Preventing the above false extraction will result in further enhancing the contrast AF performance under low illuminance. A brightness signal having good white balance can be generated for a pixel signal having relatively less noise under non-low illuminance, and therefore, the AF evaluation can be achieved with the brightness signal dependent upon the signal intensity of each color component.

When the photometry unit 111 prepared separately from the image capturing device 103 is used for the determination processing explained above, this is effective for a situation where there is a large amount of noise of the image capturing device 103 set at a high sensitivity for low illuminance, and the average values of the outputs of the output signals become high in appearance.

In the present embodiment, the photometry unit 111 is expressed as a unit separated from the image capturing device 103, but the present embodiment is not limited thereto. The same role as the photometry unit 111 can be achieved even with an apparatus capable of measuring absolute light using the image capturing device 103 without increasing the sensitivity even under low illuminance.

Third Embodiment

Hereinafter, the third embodiment of the present invention in which correction processing of signal intensities of pixel signals is performed will be explained with reference to FIGS. 1 and 8.

The block diagram of the third embodiment of the present invention has the same configuration as the image capturing apparatus 1000 which is the block diagram of the first embodiment.

Figure 8:
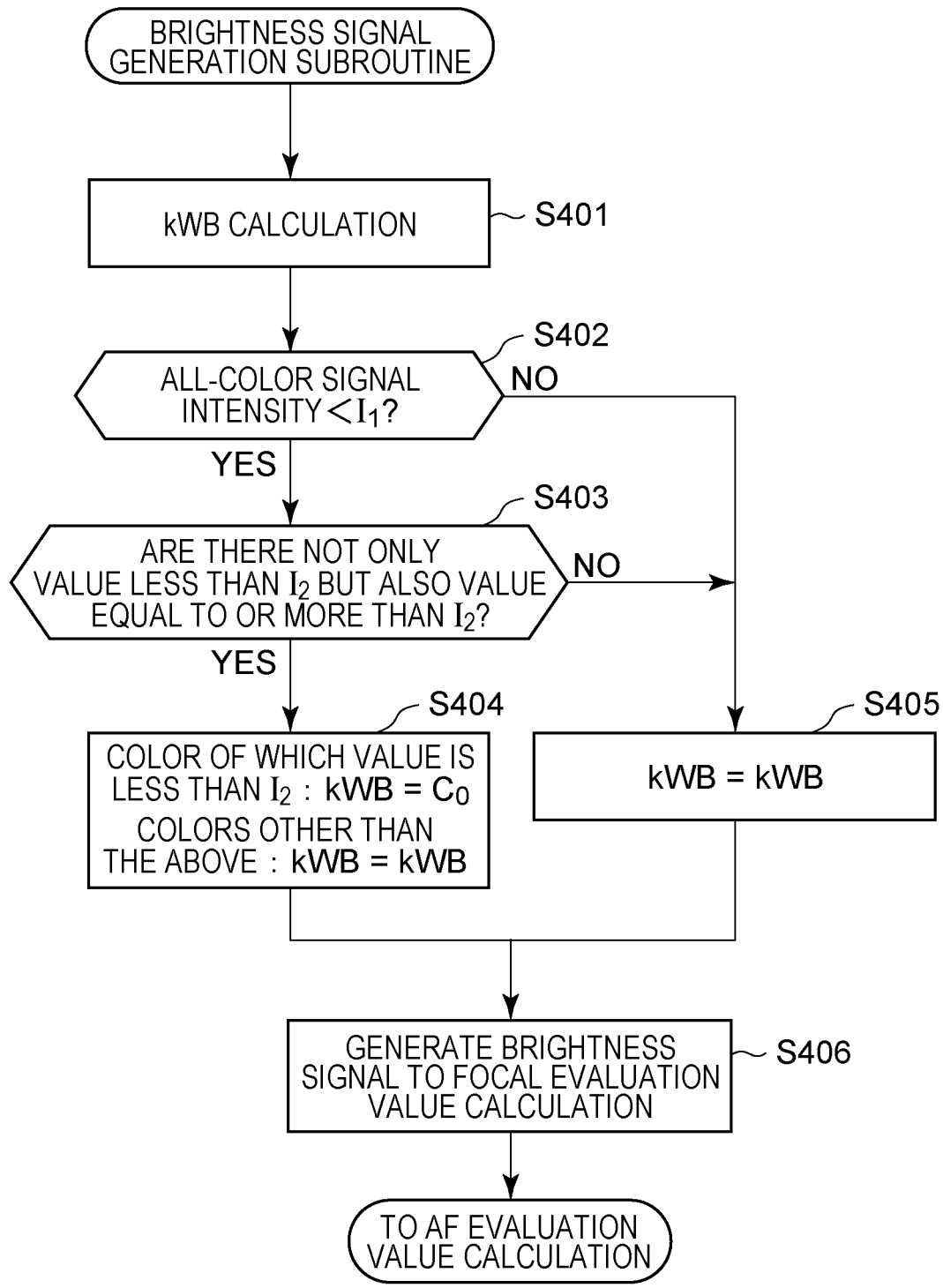
FIG. 8 is a flow diagram illustrating brightness signal generation performed by an image capturing apparatus according to the third embodiment.

FIG. 8 is a flow diagram illustrating a brightness signal generation sub-routine performed in steps S101 and S105 of FIG. 2 by the focal evaluation value calculation processing unit 107 from reading of the pixel signals from the image capturing device 103 in the contrast AF operation performed by the image capturing apparatus 1000 according to the third embodiment of the present invention.

With the pixel signals R, G1, G2, B guided to the CPU 104 serving as the control unit, the signal intensity detection unit 105 calculates the white balance coefficient kWB explained above (step S401). Further, a determination as shown in step S402 explained below is made.

More specifically, a determination is made as to whether all of the average values $I_R$, $I_{G1}$, $I_{G2}$, $I_B$ of the signal intensities serving as the signal intensity evaluation values of the color components are less than a first threshold value (first signal intensity) $I_1$ defining the low brightness of the subject. When this determination is YES (all of the average values $I_R$, $I_{G1}$, $I_{G2}$, $I_B$ of the signal intensities are less than the first threshold value $I_1$), step S403 is subsequently performed. When the determination is NO in step S403 (one or more of the average values $I_R$, $I_{G1}$, $I_{G2}$, $I_B$ of the signal intensities is of a value equal to or more than the first threshold value $I_1$), step S405 is subsequently performed.

In step S403, further, the following determination is made. More specifically, a determination is made as to whether at least one of the average values $I_R$, $I_{G1}$, $I_{G2}$, $I_B$ of the signal intensities of the color components is less than a second threshold value (second signal intensity) $I_2$ which is less than the threshold value $I_1$ defining low brightness of the subject and at least another of them is equal to or more than the second threshold value $I_2$. When this determination is YES (for example, when $I_B < I_2 < I_{G1}$ holds), step S404 is subsequently performed.

When the determination is not YES (when all the average values $I_R$, $I_{G1}$, $I_{G2}$, $I_B$ of the signal intensities are equal to or more than the second threshold value $I_2$), step S405 is subsequently performed. In step S404, first, all the white balance coefficients kWB_R, kWB_G1, kWB_G2, kWB_B not dependent upon the signal intensity of each color component as shown in the expression 3 calculated by the signal intensity detection unit 105 as described above are called.

Then, for the average values $I_R$, $I_{G1}$, $I_{G2}$, $I_B$ of the signal intensities of the color components that are less than the second threshold value $I_2$, the white balance coefficient not dependent upon the signal intensity of each color component as shown in the expression 3 thus called is replaced with a predetermined value $C_0$ not dependent upon the signal intensity of each color component. On the other hand, for the average values $I_R$, $I_{G1}$, $I_{G2}$, $I_B$ of the signal intensities of the color components that are equal to or more than the second threshold value $I_2$, the white balance coefficients kWB_R, kWB_G1, kWB_G2, kWB_B of the color components as shown in the expression 3 thus called are maintained.

The predetermined value $C_0$ is a constant for multiplying an output signal of which signal intensity is extremely low and of which noise existence ratio is high, and therefore, it is desired to completely eliminate the influence, e.g., $C_0=0$ in a simple manner.

Then, step S406, the output signals of the color components in the focus detection area F are multiplied by the predetermined value $C_0$ or all the white balance coefficients kWB_R, kWB_G1, kWB_G2, kWB_B of the color components as shown in the expression 3 obtained in step S404, and the output signals are adopted as the brightness signals.

In the subsequent calculation of the focal evaluation value by the focal evaluation value calculation processing unit 107, the brightness signals obtained here are used.

In step S405, all the white balance coefficients kWB_R, kWB_G1, kWB_G2, kWB_B of the color components as shown in the expression 3 calculated by the signal intensity detection unit 105 are determined to be hereinafter used as kWB_R, kWB_G1, kWB_G2, kWB_B as they are.

Then, in step S406, the output signals of the color components in the focus detection area F are multiplied by all the white balance coefficients kWB_R, kWB_G1, kWB_G2, kWB_B of the color components as shown in the expression 3 obtained in step S405, and the output signals are adopted as the brightness signals.

In the subsequent calculation of the focal evaluation value by the focal evaluation value calculation processing unit 107, the brightness signals are used. This loop is terminated here.

It should be noted that, in the present embodiment, the above processing is carried out in steps S101 and S105 in FIG. 2. However, the present embodiment is not limited thereto. For example, processing before the brightness signal generation processing (S406) such as the calculation (S401) of the white balance coefficient kWB and the replacement (S404) of the white balance coefficient may be carried out only at the initial position $P_1$ of the focus lens 102.

For example, when the signal intensity B of the output signal of the B color component is the least among the four output signals, i.e., the output signal of the R color component, the output signal of the G1 color component, the output signal of the G2 color component, and the output signal of the B color component, the amounts of noise of the four output signals are usually at the same level, and therefore, the ratio of the noise of the output signal of the B color component is the highest.

Therefore, when, in order to normalize the signal intensity of each color component, the output signal of the B color component of which noise ratio is the highest is multiplied by the white balance coefficient kWB_B as shown in the expression 3, then this greatly increases the standing noise caused by dark current included in weak signal intensity and components of random noise such as shot noise. Therefore, a brightness signal with a high rate of noise component is generated, which reduces the accuracy of the AF evaluation.

When all the average values $I_R$, $I_{G1}$, $I_{G2}$, $I_B$ of the signal intensities of the color components are less than the second threshold value $I_2$ defining the low brightness of the subject, the amounts of noise of the four output signals are usually at the same level, and therefore, the ratios of the noise of the four output signals are high.

In such a case, the four output signals, i.e., the output signal of the R color component, the output signal of the G1 color component, the output signal of the G2 color component, and the output signal of the B color component are multiplied by the white balance coefficient which is the predetermined value $C_0$ not dependent upon the signal intensities of the output signals of the color components.

As described above, all the average values $I_R$, $I_{G1}$, $I_{G2}$, $I_B$ of the signal intensities of the color components are compared with the first threshold value $I_1$ defining the low brightness of the subject and the second threshold value $I_2$ which is less than the first threshold value $I_1$, and accordingly, a determination is made as to whether to use the white balance coefficients of the color components as shown in the expression 3 calculated by the signal intensity detection unit 105.

The following advantages are obtained. That is, when the signal intensity is very low due to low illuminance, the output signals of the color components are not multiplied by the white balance coefficients kWB_R, kWB_G1, kWB_G2, kWB_B of the color components as shown in the expression 3, and this can preferably prevent great rise in the standing noise caused by dark current included in weak signal intensity and components of random noise such as shot noise.

More specifically, when the determination is made as to whether to use the white balance coefficients as shown in the expression 3 dependent upon the signal intensity of each color component, this can preferably prevent the noise from being enlarged by multiplying the output signals of which noise ratio is high and of which signal intensity is extremely low by the white balance coefficient of the predetermined value not dependent upon the signal intensities.

Fourth Embodiment

Hereinafter, the fourth embodiment of the present invention in which correction processing of signal intensities of pixel signals is performed will be explained with reference to FIG. 9. The block diagram of the image capturing apparatus is the same as that of the image capturing apparatus 2000 in FIG. 6 of the second embodiment.

In the second embodiment of the present invention, the photometry result given by the photometry unit 111 is used to determine whether or not to use collectively the white balance coefficients as shown in the expression 3 dependent upon the signal intensity of each color component calculated by the signal intensity detection unit 105, but in the fourth embodiment of the present invention, the white balance coefficients as shown in the expression 3 dependent upon the signal intensity of each color component are identified using a photometry result given by the photometry unit 111 for each color component.

Accordingly, when the photometry unit 111 measures a subject brightness, the photometry unit 111 is configured to perform measurement for each of the color components of red, green, and blue, and this feature is the difference between the present fourth embodiment and the second embodiment.

In the contrast AF operation performed by the image capturing apparatus 2000, operation for detecting the in-focus position of the focus lens 102 by searching and driving a predetermined section is the same as FIG. 2 explained in the first embodiment, and therefore it is not described here.

Figure 9:
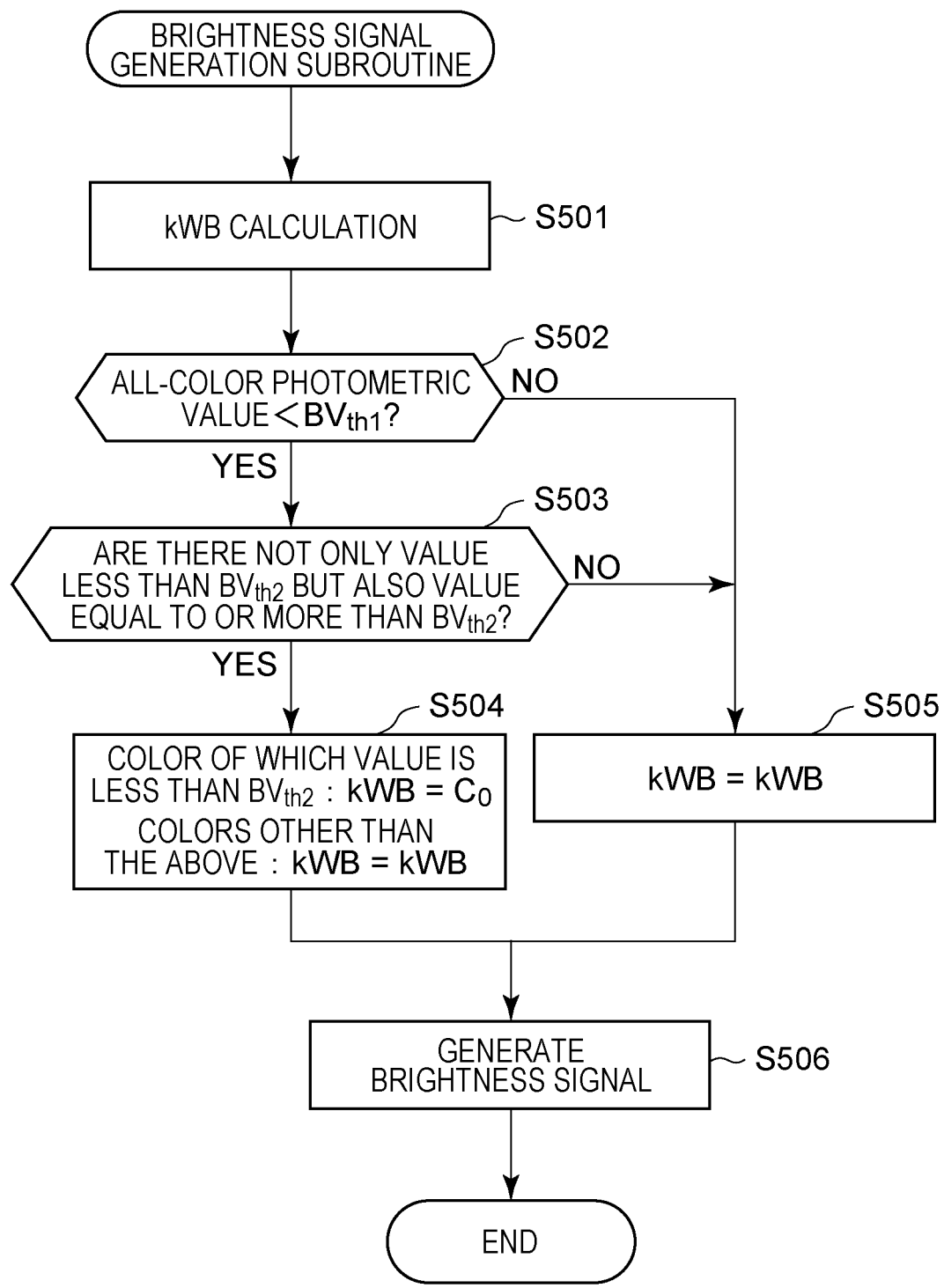
FIG. 9 is a flow diagram illustrating brightness signal generation performed by the image capturing apparatus according to the fourth embodiment.

FIG. 9 is a flow diagram illustrating a brightness signal generation sub-routine performed in steps S101 and S105 of FIG. 2 by the focal evaluation value calculation processing unit 107 from reading of the pixel signals serving as the output signals from the image capturing device 103 in the contrast AF operation performed by the image capturing apparatus 2000 according to the fourth embodiment of the present invention.

With the pixel signals R, G1, G2, B of the color components guided to the CPU 104 serving as the control unit, the signal intensity detection unit 105 calculates the white balance coefficient kWB explained above (step S501). Further, a determination as shown in step S502 explained below is made.

More specifically, a determination is made, for each color, as to whether subject brightness $BV_R$, $BV_G$, $BV_B$ of the color components measured by the photometry unit 111 are less than a threshold value $BV_{th1}$ of the first brightness which defines a low brightness of a subject. When this determination is YES (when less than the threshold value $BV_{th1}$ of the first brightness), step S503 is subsequently performed. When the determination is NO in step S502 (when more than the threshold value $BV_{th1}$ of the first brightness), step S505 is subsequently performed.

In step S503, the following determination is made. More specifically, a determination is made as to whether at least one of the subject brightness $BV_R$, $BV_G$, $BV_B$ of the color components thus measured is less than a threshold value $BV_{th2}$ of the second brightness which is less than the threshold value $BV_{th1}$ of the first brightness defining low brightness of the subject as explained above and at least another of them is equal to or more than the second threshold value $BV_{th2}$ of the second brightness.

When this determination is YES (for example, when $BV_B < BV_{th2} < BV_G$ holds), step S404 is subsequently performed.

When the determination is NO (when all the photometric values $BV_R$, $BV_G$, $BV_B$ of the color components are equal to or more than $BV_{th2}$), step S505 is subsequently performed. In step S504, first, all the white balance coefficients kWB_R, kWB_G1, kWB_G2, kWB_B of the color components as shown in the expression 3 dependent upon the signal intensity of each color component calculated by the signal intensity detection unit 105 as described above are called.

Then, for the photometric values $BV_R$, $BV_G$, $BV_B$ of the color components that are less than the threshold value $BV_{th2}$ of the second brightness, the called white balance coefficients kWB_R, kWB_G1, kWB_G2, kWB_B are replaced with $C_0$ which is a predetermined value.

For the photometric values $BV_R$, $BV_G$, $BV_B$ of the color components that are equal to or more than the threshold value $BV_{th2}$ of the second brightness, the white balance coefficients kWB_R, kWB_G1, kWB_G2, kWB_B as shown in the expression 3 dependent upon the signal intensity of each color component thus called are maintained as they are. The predetermined value $C_0$ is a constant for multiplying an output signal of which signal intensity is extremely low and of which noise existence ratio is high, and therefore, it is desired to completely eliminate the influence, e.g., $C_0=0$ in a simple manner.

Then, in step S506, the output signals of the color components in the focus detection area F are multiplied by the predetermined value $C_0$ obtained in step S504, and the output signals are adopted as the brightness signals.

In the subsequent calculation of the focal evaluation value by the focal evaluation value calculation processing unit 107, the brightness signals obtained here are used.

In step S505, all the white balance coefficients kWB_R, kWB_G1, kWB_G2, kWB_B as shown in the expression 3 dependent upon the signal intensity of each color component calculated by the signal intensity detection unit 105 are determined to be hereinafter used as kWB_R, kWB_G1, kWB_G2, kWB_B as they are.

Then, in step S506, the output signals of the color components in the focus detection area F are multiplied by the white balance coefficients kWB_R, kWB_G1, kWB_G2, kWB_B serving as the signal intensity amplification factors obtained in step S505, and the output signals are adopted as the brightness signals.

In the subsequent calculation of the focal evaluation value by the focal evaluation value calculation processing unit 107, the brightness signals are used. This loop is terminated here.

It should be noted that, in the present embodiment, the above processing is carried out in steps S101 and S105 in FIG. 2. However, the present embodiment is not limited thereto. For example, processing before the brightness signal generation processing (S506) such as the calculation (S501) of the white balance coefficient kWB and the replacement (S504) of the white balance coefficient may be carried out only at the initial position $P_1$ of the focus lens 102.

As described above, the photometry result for each color component given by the photometry unit 111 is compared with the threshold value $BV_{th1}$ of the first brightness defining the low brightness of the subject and the threshold value $BV_{th2}$ of the second brightness which is less than the threshold value $BV_{th1}$ of the first brightness, and a determination is made as to whether to use all the white balance coefficients kWB_R, kWB_G1, kWB_G2, kWB_B as shown in the expression 3 dependent upon the signal intensities of the color components calculated by the signal intensity detection unit 105.

That is, when the signal intensity is very low due to low illuminance, the white balance coefficients as shown in the expression 3 dependent upon the signal intensity of each color component are not multiplied, and this can preferably prevent great rise in the standing noise caused by dark current included in weak signal intensity and components of random noise such as shot noise.

Fifth Embodiment

The fifth embodiment of the present invention in which correction processing of signal intensities of pixel signals is performed will be explained with reference to FIGS. 10, 11A, and 11B.

Figure 10:
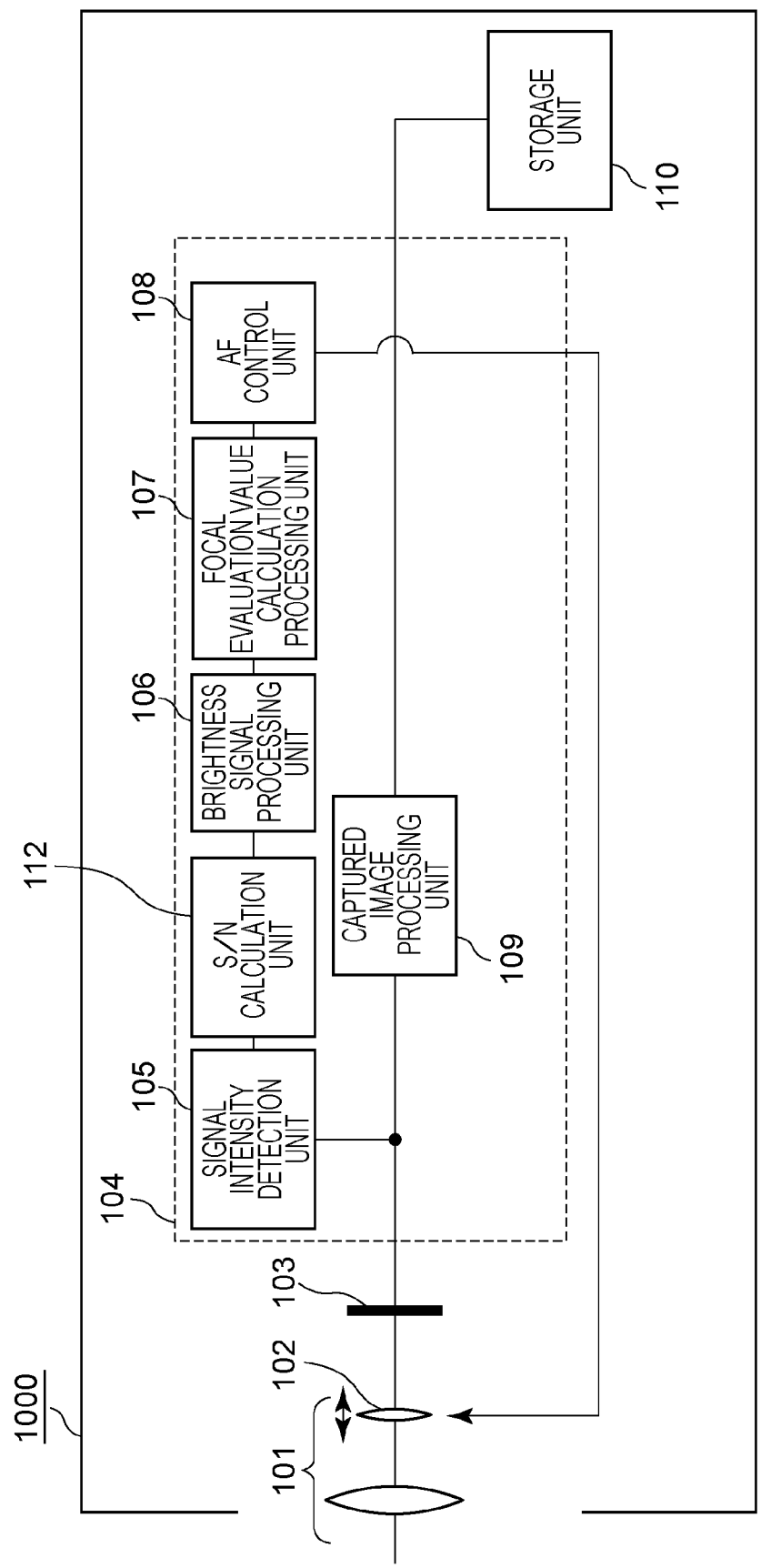
FIG. 10 is a block diagram illustrating a configuration of an image capturing apparatus according to a fifth embodiment.

FIG. 10 is a block diagram illustrating a configuration of an image capturing apparatus according to the fifth embodiment of the present invention. The configuration of the image capturing apparatus according to the fifth embodiment of the present invention is different from the configuration of the image capturing apparatus 1000 according to the first embodiment in that a CPU 104 includes an S/N calculation unit 112 which is a noise ratio calculation unit.

The S/N calculation unit 112 detects a ratio of the noise component occupied in the signal intensity of each of the signal intensities R, G1, G2, B of the color component pixel signals detected by the signal intensity detection unit 105.

The method of calculation of the white balance coefficients serving as the signal intensity amplification factors as shown in the expression 3 is the same as the method described in the first embodiment, and therefore it is not described here.

Figure 11B:
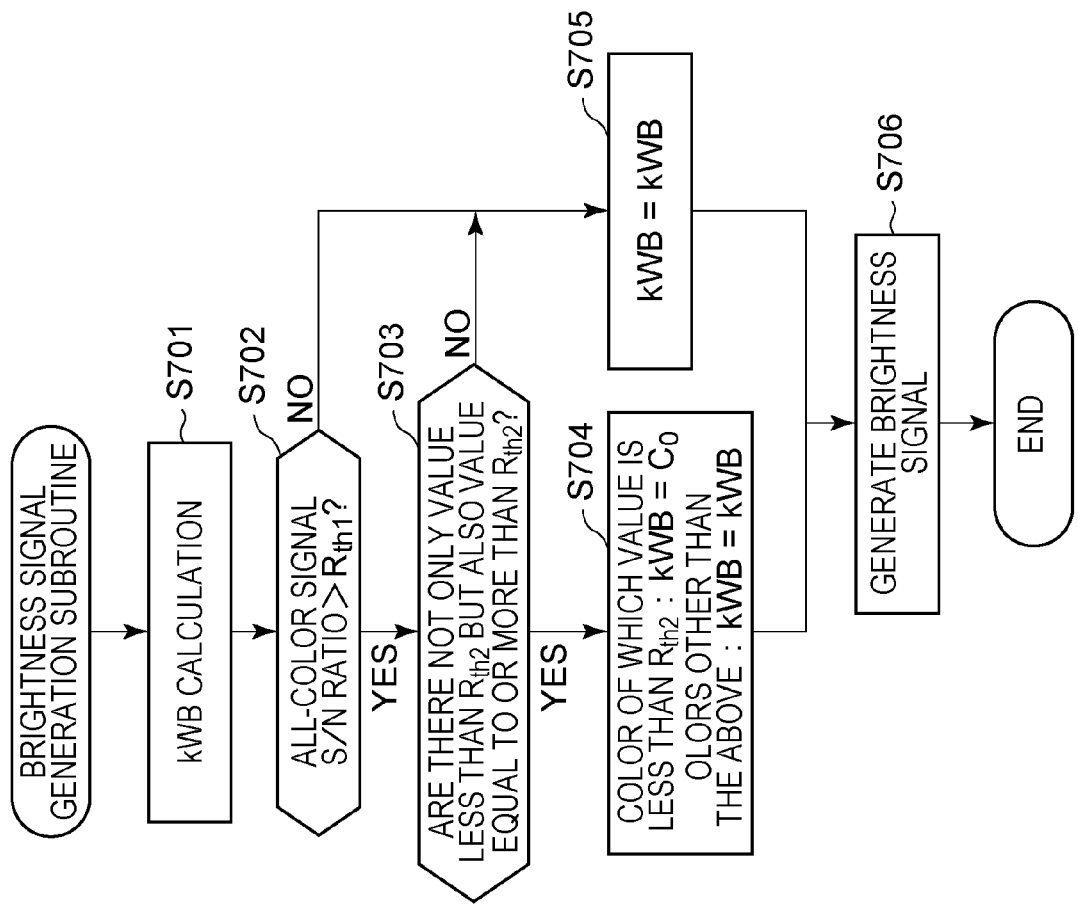
FIGS. 11A and 11B are flow diagrams illustrating brightness signal generation performed by the image capturing apparatus according to the fifth embodiment.
Figure 11A:
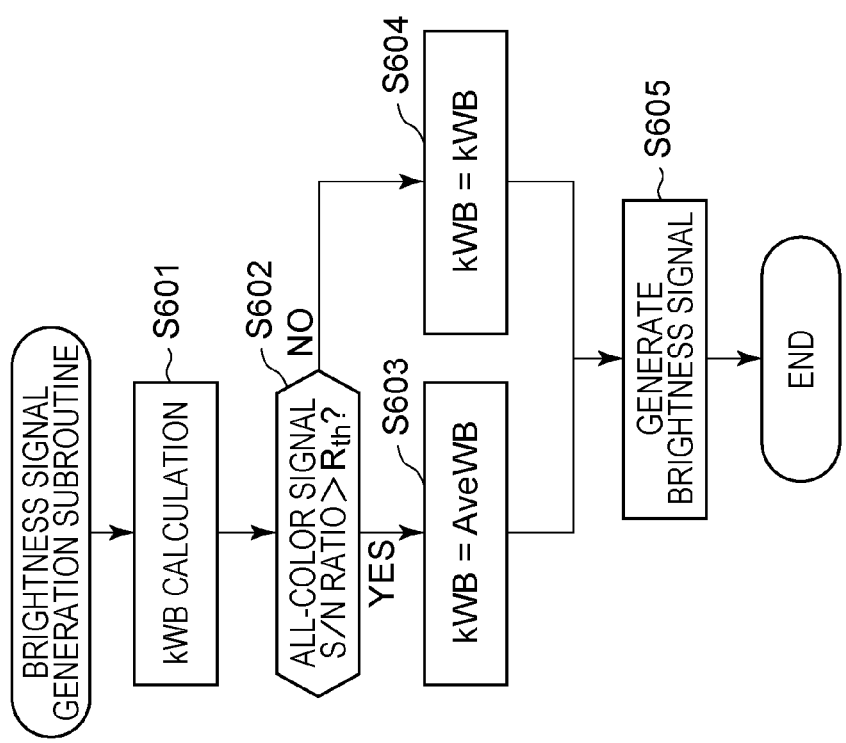

FIGS. 11A and 11B are flow diagrams illustrating brightness signal generation sub-routine performed by the image capturing apparatus according to the fifth embodiment of the present invention. FIGS. 11A and 11B illustrate two flows in which brightness signal generation is performed using the S/N calculation unit 112 serving as the noise ratio calculation unit in the CPU 104.

First, the flow of FIG. 11A will be explained.

With the pixel signals R, G1, G2, B serving as the output signals in the focus detection area F guided to the CPU 104, the signal intensity detection unit 105 calculates the white balance coefficient kWB explained above (step S601). Further, a determination as shown in step S602 explained below is made.

More specifically, a determination is made as to whether all the S/N ratios of the pixel signals of the color components included in the focus detection area F calculated by the S/N calculation unit 112 are more than a threshold value $R_{th}$ defining whether subsequent evaluation value calculation is affected or not.

When this determination is YES, step S603 is subsequently performed.

When this determination is NO, step S604 is subsequently performed. In step S603, all the white balance coefficients kWB_R, kWB_G1, kWB_G2, kWB_B as shown in the expression 3 calculated by the signal intensity detection unit 105 as described above are called, and are replaced with AveWB which is the same constant C (AveWB is the same value as that of the first embodiment).

In step S604, all the white balance coefficients kWB_R, kWB_G1, kWB_G2, kWB_B of the color components as shown in the expression 3 calculated by the signal intensity detection unit 105 explained above are determined to be hereinafter used as kWB_R, kWB_G1, kWB_G2, kWB_B as they are.

Subsequently, in step S605, the signal intensities in the focus detection area F are multiplied by the constant coefficient AveWB obtained in step S603 and the white balance coefficients kWB_R, kWB_G1, kWB_G2, kWB_B of the color components as shown in the expression 3 obtained in step S604, and the products are adopted as the brightness signals.

In the subsequent calculation of the focal evaluation value by the focal evaluation value calculation processing unit 107, the brightness signals are used. This loop is terminated here.

Subsequently, the flow of FIG. 11B will be explained.

With the pixel signals R, G1, G2, B serving as the output signals in the focus detection area F guided to the CPU 104, the signal intensity detection unit 105 calculates the white balance coefficient kWB explained above (step S701). Further, a determination as shown in step S702 explained below is made.

More specifically, a determination is made as to whether all the S/N ratios of the pixel signals of the color components included in the focus detection area F calculated by the S/N calculation unit 112 are more than a first threshold value $R_{th1}$ defining whether subsequent evaluation value calculation is affected or not.

When the determination is YES, step S703 is subsequently performed. When the determination is NO, step S705 is subsequently performed.

In step S703, a determination is made as to whether at least one of the S/N ratios of the pixel signals of the color components included in the focus detection area F calculated by the S/N calculation unit 112 is more than a second threshold value $R_{th2}$ which is more than the first threshold value $R_{th1}$ explained above, and at least another of them is equal to or less than the second threshold value $R_{th2}$.

When the determination is YES, step S704 is subsequently performed.

When the determination is NO, step S706 is subsequently performed. In step S705, first, all the white balance coefficients kWB_R, kWB_G1, kWB_G2, kWB_B of the color components as shown in the expression 3 dependent upon the signal intensity of each color component calculated by the signal intensity detection unit 105 as described above are called.

Then, for the S/N ratios of the color components more than the second threshold value $R_{th2}$, the white balance coefficients kWB_R, kWB_G1, kWB_G2, kWB_B thus called are replaced with $C_0$ which is a predetermined value.

On the other hand, for the S/N ratios of the color components equal to or less than the second threshold value $R_{th2}$, the white balance coefficients kWB_R, kWB_G1, kWB_G2, kWB_B as shown in the expression 3 dependent upon the signal intensity of each color component thus called are maintained as they are. The predetermined value $C_0$ is a constant for multiplying an output signal of which signal intensity is extremely low and of which noise existence ratio is high, and therefore, it is desired to completely eliminate the influence, e.g., $C_0=0$ in a simple manner.

Then, in step S706, the output signals of the color components in the focus detection area F are multiplied by the predetermined value $C_0$ obtained in step S704, and the products are adopted as the brightness signals.

In the subsequent calculation of the focal evaluation value by the focal evaluation value calculation processing unit 107, the brightness signals obtained here are used.

In step S705, all the white balance coefficients kWB_R, kWB_G1, kWB_G2, kWB_B as shown in the expression 3 dependent upon the signal intensity of each color component calculated by the signal intensity detection unit 105 are determined to be hereinafter used as kWB_R, kWB_G1, kWB_G2, kWB_B as they are.

Then, in step S706, the output signals of the color components in the focus detection area F are multiplied by the white balance coefficients kWB_R, kWB_G1, kWB_G2, kWB_B serving as the signal intensity amplification factors obtained in step S705, and the output signals are adopted as the brightness signals.

In the subsequent calculation of the focal evaluation value by the focal evaluation value calculation processing unit 107, the brightness signals are used. This loop is terminated here.

It should be noted that, in the present embodiment, the above processing is carried out in steps S101 and S105 in FIG. 2. However, the present embodiment is not limited thereto. For example, processing before the brightness signal generation processing (S605) such as the calculation (S601) of the white balance coefficient kWB and the replacement (S603) of the white balance coefficient may be carried out only at the initial position $P_1$ of the focus lens 102.

In the fifth embodiment, the ratio of the noise included in the pixel signals of the color components is directly observed, and based on the value, a determination is made as to whether to use the white balance coefficients kWB_R, kWB_G1, kWB_G2, kWB_B of the color components as shown in the expression 3 calculated by the signal intensity detection unit 105.

More specifically, in the present embodiment, when the ratio of the noise of the output signal is less than the predetermined value, the signal intensity amplification factor of each color component is changed in accordance with the signal intensity evaluation value of each color component, and when the ratio of the noise of the output signal is equal to or more than the predetermined value, at least the signal intensity amplification factor of the output signal of the color component of which ratio of the noise is the highest is adopted as the predetermined value not dependent upon the signal intensity evaluation value of each color component.

For example, the focal evaluation value can be calculated more effectively under an image capturing condition in which the signal intensity of the pixel signal is sufficiently high (high illuminance) but the noise ratio included in the pixel signal is extremely high.

The above five embodiments have been explained using the compact digital camera, but the embodiments are not limited thereto. The embodiments can be applied to any image capturing apparatus using an image capturing device such as a digital single-lens reflex camera, a digital non-reflex camera including a mirrorless camera, and a digital video camera.

The white balance coefficient WB is not limited to the white balance coefficient WB defined in the first to fourth embodiments.

This can be replaced by similar numerical values constituted by the signal intensity of each color component and ratios of signal intensities thereof.

Preferred embodiments of the present invention have been hereinabove explained, but the present invention is not limited to these embodiments. Embodiments can be modified and changed in various manners within the scope of the present invention.

Other Embodiments

Embodiments of the present invention can also be realized by a computer of a system or apparatus that reads out and executes computer executable instructions recorded on a storage medium (e.g., computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-127382, filed Jun. 4, 2012, which is hereby incorporated by reference herein in its entirety.

What is claimed is:

1. An image capturing apparatus comprising:
an image capturing device for capturing a subject image that has passed through an image capturing optical system having a focal point optical system;
a memory; and
a control unit, including a processor, in communication with the memory, the control unit configured to control:
a brightness signal processing unit for generating a brightness signal obtained by performing signal intensity correction processing using a signal intensity amplification factor on an output signal of each color component which is output from the image capturing device;
a focal evaluation value calculation processing unit for calculating a focal evaluation value by extracting a particular frequency component from the brightness signal;
a signal intensity detection unit for calculating a signal intensity evaluation value of each color component in an area on the image capturing device where a brightness signal is generated, the area corresponding to a focus detection area;
wherein, when a signal intensity of the output signal is greater than or equal to a predetermined value, the control unit changes the signal intensity amplification factor of each color component in accordance with the signal intensity evaluation value of the color component, and
when the signal intensity of the output signal is less than the predetermined value, the control unit sets at least a signal intensity amplification factor of a color component, of which signal intensity evaluation value of the color component is the least, at a value different from the signal intensity amplification factor of the color component.

2. The image capturing apparatus according to claim 1, wherein when the signal intensity of the output signal is less than the predetermined value, the control unit sets the signal intensity amplification factor of each color component at a value different from the signal intensity amplification factor of the color component.

3. The image capturing apparatus according to claim 2, wherein when the signal intensity of the output signal is less than the predetermined value, the control unit sets the signal intensity amplification factor of each color component as a same constant.

4. The image capturing apparatus according to claim 2, wherein the signal intensity evaluation value of each color component in the area on the image capturing device where the brightness signal is generated, the area corresponding to the focus detection area, is an average value of signal intensity of each color component in the area on the image capturing device where the brightness signal is generated, the area corresponding to the focus detection area, and
when all the average values of the signal intensity of each color component are less than the predetermined value, the control unit sets the signal intensity amplification factor of each color component as the average value of the signal intensities of the color components.

5. An image capturing apparatus comprising:
an image capturing device for capturing a subject image that has passed through an image capturing optical system having a focal point optical system;
a photometry unit for detecting brightness of a subject;
a memory; and
a control unit, including a processor, in communication with the memory, the control unit configured to control:
a brightness signal processing unit for generating a brightness signal obtained by performing signal intensity correction processing using a signal intensity amplification factor on an output signal of each color component which is output from the image capturing device;

a focal evaluation value calculation processing unit for calculating a focal evaluation value by extracting a particular frequency component from the brightness signal;

a signal intensity detection unit for calculating a signal intensity evaluation value of each color component in an area on the image capturing device where a brightness signal is generated, the area corresponding to a focus detection area; and wherein when the subject brightness detected by the photometry unit is equal to or more than a predetermined value, the control unit changes the signal intensity amplification factor of each color component in accordance with the signal intensity evaluation value of the color component, and when the subject brightness detected by the photometry unit is less than the predetermined value, the control unit sets at least a signal intensity amplification factor of a color component, of which signal intensity evaluation value of the color component is the least, at a value different from the signal intensity amplification factor of the color component.

6. The image capturing apparatus according to claim 5, wherein when the subject brightness detected by the photometry unit is less than the predetermined value, the control unit sets the signal intensity amplification factor of each color component at a value different from the signal intensity amplification factor of the color component.

7. The image capturing apparatus according to claim 6, wherein when the subject brightness detected by the photometry unit is less than the predetermined value, the control unit sets the signal intensity amplification factor of each color component as a same constant.

8. The image capturing apparatus according to claim 5, wherein the signal intensity evaluation value in the area on the image capturing device where the brightness signal is generated, the area corresponding to the focus detection area is the average value of signal intensity of each color component in the area on the image capturing device where the brightness signal is generated, the area corresponding to the focus detection area.

9. An image capturing apparatus comprising:

an image capturing device for capturing a subject image that has passed through an image capturing optical system having a focal point optical system;

a memory; and a control unit, including a processor, in communication with the memory, the control unit configured to control:

a brightness signal processing unit for generating a brightness signal obtained by performing signal intensity correction processing using a signal intensity amplification factor on an output signal of each color component which is output from the image capturing device;

a focal evaluation value calculation processing unit for calculating a focal evaluation value by extracting a particular frequency component from the brightness signal;

a signal intensity detection unit for calculating a signal intensity evaluation value of each color component in an area on the image capturing device where a brightness signal is generated, the area corresponding to a focus detection area;

a noise ratio calculation unit for calculating a ratio of noise in an output signal of each color component in the area on the image capturing device where the brightness signal is generated, the area corresponding to the focus detection area; and wherein when the ratio of the noise in the output signal is less than a predetermined value, the control unit changes the signal intensity amplification factor of each color component in accordance with the signal intensity evaluation value of the color component, and when the ratio of the noise in the output signal is equal to or more than the predetermined value, the control unit sets at least a signal intensity amplification factor of an output signal of a color component, of which ratio of noise is the highest, at a value different from the signal intensity amplification factor of the color component.

10. The image capturing apparatus according to claim 9, wherein when the ratio of the noise in the output signal is greater than or equal to the predetermined value, the control unit sets the signal intensity amplification factor of each color component at a value different from the signal intensity amplification factor of the color component.

11. The image capturing apparatus according to claim 10, wherein when the ratio of the noise in the output signal is greater than or equal to the predetermined value, the control unit sets the signal intensity amplification factor of each color component as a same constant.

12. The image capturing apparatus according to claim 9, wherein the signal intensity evaluation value in the area on the image capturing device where the brightness signal is generated, the area corresponding to the focus detection area, is an average value of signal intensity of each color component in the area on the image capturing device where the brightness signal is generated, the area corresponding to the focus detection area.

13. A control method, implemented by a control unit, including a processor, for an image capturing apparatus, comprising:

generating a brightness signal obtained by performing signal intensity correction processing using a signal intensity amplification factor on an output signal of each color component which is output from an image capturing device for capturing a subject image that has passed through an image capturing optical system having a focal point optical system;

calculating a focal evaluation value by extracting a particular frequency component from the brightness signal;

calculating a signal intensity evaluation value of each color component in an area on the image capturing device where a brightness signal is generated, the area corresponding to a focus detection area; and controlling such that when a signal intensity of the output signal is equal to or more than a predetermined value, the signal intensity amplification factor of each color component is changed in accordance with the signal intensity evaluation value of the color component, and when the signal intensity of the output signal is less than the predetermined value, at least a signal intensity amplification factor of a color component, of which signal intensity evaluation value of the color component is the least, is set at a value different from the signal intensity amplification factor of the color component.

14. A control method, implemented by a control unit, including a processor, for an image capturing apparatus, comprising:

generating a brightness signal obtained by performing signal intensity correction processing using a signal intensity amplification factor on an output signal of each color component which is output from an image capturing device for capturing a subject image that has passed through an image capturing optical system having a focal point optical system;

calculating a focal evaluation value by extracting a particular frequency component from the brightness signal;

detecting brightness of the subject;

calculating a signal intensity evaluation value of each color component in an area on the image capturing device where a brightness signal is generated, the area corresponding to a focus detection area; and controlling such that when the subject brightness detected in the detecting is equal to or more than a predetermined value, the signal intensity amplification factor of each color component is changed in accordance with the signal intensity evaluation value of the color component, and when the subject brightness detected in the detecting is less than the predetermined value, at least a signal intensity amplification factor of a color component, of which signal intensity evaluation value of the color component is the least, is set at a value different from the signal intensity amplification factor of the color component.

15. A control method, implemented by a control unit, including a processor, for an image capturing apparatus, comprising:

generating a brightness signal obtained by performing signal intensity correction processing using a signal intensity amplification factor on an output signal of each color component which is output from an image capturing device for capturing a subject image that has passed through an image capturing optical system having a focal point optical system;

calculating a focal evaluation value by extracting a particular frequency component from the brightness signal;

calculating a signal intensity evaluation value of each color component in an area on the image capturing device where the brightness signal is generated, the area corresponding to a focus detection area;

calculating a ratio of noise in an output signal of each color component in the area on the image capturing device where the brightness signal is generated, the area corresponding to the focus detection area; and controlling such that when the ratio of the noise in the output signal is less than a predetermined value, the signal intensity amplification factor of each color component is changed in accordance with the signal intensity evaluation value of the color component, and when the ratio of the noise in the output signal is equal to or more than the predetermined value, at least a signal intensity amplification factor of an output signal of a color component, of which ratio of the noise is the highest, is set at a value different from the signal intensity amplification factor of the color component.

* * * * *